US006192147B1

(12) United States Patent
Bucher et al.

(10) Patent No.: US 6,192,147 B1
(45) Date of Patent: Feb. 20, 2001

(54) PROCESS FOR CONTROLLING COLORATION IN MULTICOLOR PRINTING

(75) Inventors: Harald Bucher, Eschelbronn; Wolfgang Geissler, Schönborn; Bernd Kistler, Eppingen; Werner Huber, Rauenberg, all of (DE)

(73) Assignee: Heidelberger Druckmaschinen Aktiengesellschaft, Heidelberg (DE)

( * ) Notice: Under 35 U.S.C. 154(b), the term of this patent shall be extended for 0 days.

(21) Appl. No.: 09/006,804

(22) Filed: Jan. 14, 1998

(30) Foreign Application Priority Data

Jan. 17, 1997 (DE) ........................................ 197 01 614
Oct. 30, 1997 (DE) ........................................ 197 47 973

(51) Int. Cl.[7] ........................................ G06K 9/00
(52) U.S. Cl. ........................................ 382/165
(58) Field of Search ........................................ 382/162, 165, 382/167, 112; 358/1.9

(56) References Cited

U.S. PATENT DOCUMENTS 4,791,450 * 12/1988 Mosehauer et al. .................. 355/77
5,089,977 2/1992 Pflasterer et al. .................. 358/425
5,384,859 1/1995 Bolza-Schunemann et al. ... 382/112
5,947,029 * 9/1999 Loeffler et al. ..................... 101/484

FOREIGN PATENT DOCUMENTS

WO9500336 5/1995 (WO) .

* cited by examiner

*Primary Examiner*—Phuoc Tran
(74) *Attorney, Agent, or Firm*—Tarolli, Sundheim, Covell, Tummino & Szabo L.L.P.

(57) ABSTRACT

A process for controlling coloration in multicolor printing, wherein a photoelectric measuring arrangement (3) is used to obtain actual color measurement values from the printed image (4), wherein the actual color measurement values are compared with specified setpoint color measurement values, and wherein the comparison signals are supplied to a color controlling device (12), with the layer thickness of the ink to be applied to a material to be printed (1) being controllable by means of color controlling elements (12), monitoring signals are continuously derived at selected measuring locations (8), whereby the number of the measuring locations (8) is increased if the monitoring signals exceed a specified threshold value and the actual color measurement values obtained at the increased number ($N_2$) of measuring locations (8) are processed into comparison signal. The invention can be used in multicolor printing machines.

2 Claims, 2 Drawing Sheets

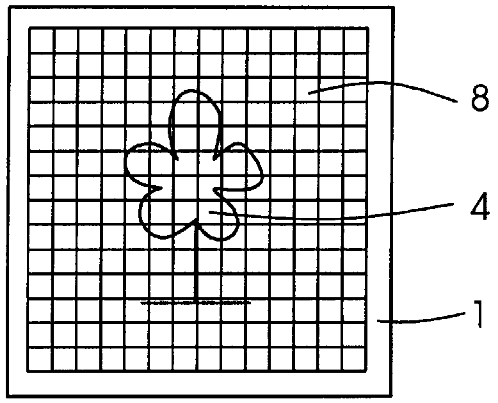
Fig.4.1
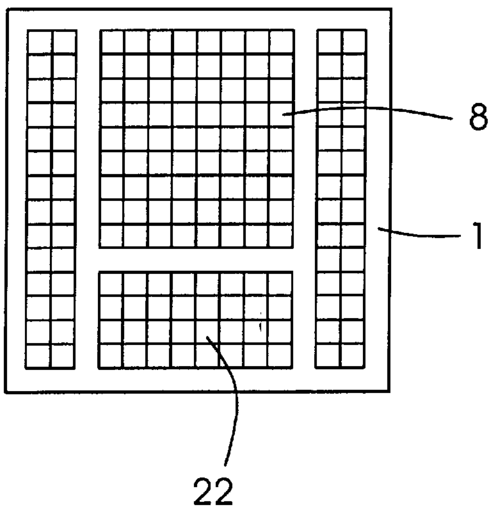
Fig.4.2
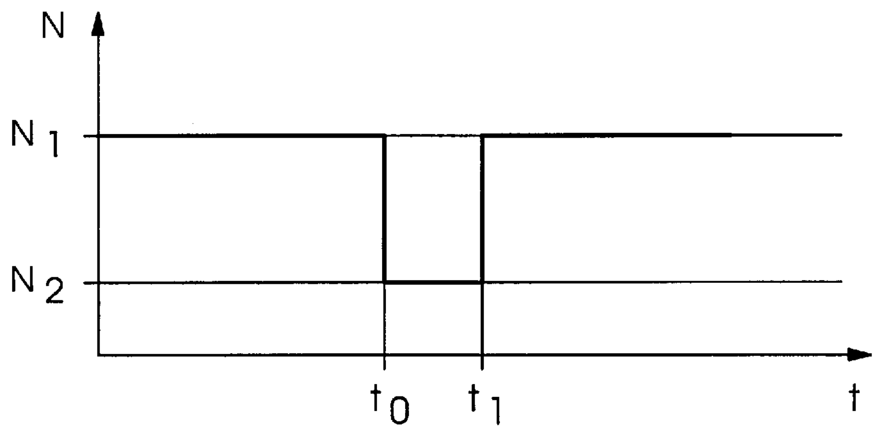
Fig.5

PROCESS FOR CONTROLLING COLORATION IN MULTICOLOR PRINTING

BACKGROUND OF THE INVENTION

The invention relates to a process for controlling coloration in multicolor printing.

Prior art solutions use an image recording arrangement for continuous determination at a plurality of measuring locations of actual color measurement values which are then compared with setpoint color measurement values in a controlling device. The signals resulting from this comparison are supplied to color controlling elements which adjust the layer thickness of the colors to be printed on top of each other such as to reduce the difference between the actual color measurement values and the setpoint color measurement values. To achieve high accuracy, the largest possible number of actual color measurement values is obtained with each printing, if at all possible.

The increase in the number of measuring locations is limited by the measuring geometry of the image recording elements and by the finite processing speed of the hardware components used for controlling. Processes have therefore been proposed wherein, for example, measured values are combined by ranges, or only a portion of the measured values is used, or the measured values from less than each printing are used.

The object of the invention is to define a process for controlling coloration which makes it possible to reduce the time required to obtain a desired coloration while maintaining high accuracy.

This object is attained by a process having the characteristic features defined in claim 1.

According to the invention, the actual color measurement values are determined in a first step at only selected measuring locations. In practice, this means that approximately 500 actual color measurement values are determined, for example, in a sheet-fed printing machine producing, for example, prints of a 1020 mm×750 mm format. A sensor for one actual color measurement value covers a range of approximately 3 mm×3 mm such that the 500 measuring locations cover less than 1% of the area of the sheet. The measuring locations selected in the first step are image-relevant positions which are particularly significant for coloration. As a rule, these are measuring locations in gray tones of a printed image in which color deviations are particularly readily observable by the human eye. The low number of measuring locations makes it possible to determine the actual color measurement values of each sheet.

In a second step, the actual color measurement values obtained from the selected measuring locations are compared with setpoint color measurement values. The resulting monitoring values are checked to determine if they exceed a given threshold value. If this is the case, actual color measurement values are then obtained once from complete image ranges up to the entire printed image. Said image ranges cover, for example, more than 10% of the printed area, whereby non-printed areas can be excluded for the purpose of measured value processing. From this substantially increased number of actual color measurement values, controlled variables are derived by comparison with set point color measurement values and are supplied to a color controlling device. Controlling elements of the color controlling devices influence the color on the printed material, for example, by changing the layer thickness of the colors to be printed on top of each other, in wet offset printing, by changing the proportion of wetting agent in an emulsion of ink and wetting agent, or by actuating register control devices or devices for changing the hue value.

The process can be used both at startup of the printing process and during a continuous printing operation. While the controlled variables are determined, which takes a certain amount of time due to the large quantity of data from the plurality of measuring locations, actual color measurement values from the few selected measuring locations are continuously processed into monitoring signals. Processing of actual color measurement values from the complete image ranges or from the entire printed range is required only at those instants when an invalid state of coloration is detected during processing of actual color measurement values originating from the selected measuring locations. To minimize errors in color control, one variant of the invention provides for averaging the actual color measurement values from the complete image ranges or the entire printed range of several sheets. Averaging of the actual color measurement values of several sheets can be carried out by means of a device based on hardware components or by means of a computer that comprises a corresponding program.

Below, the invention is described in more detail by means of an exemplary embodiment.

FIG. 4 is a diagram for expanded measured value acquisition.

FIG. 5 is a graph showing the time sequence of measured value acquisition.

Figure 1:
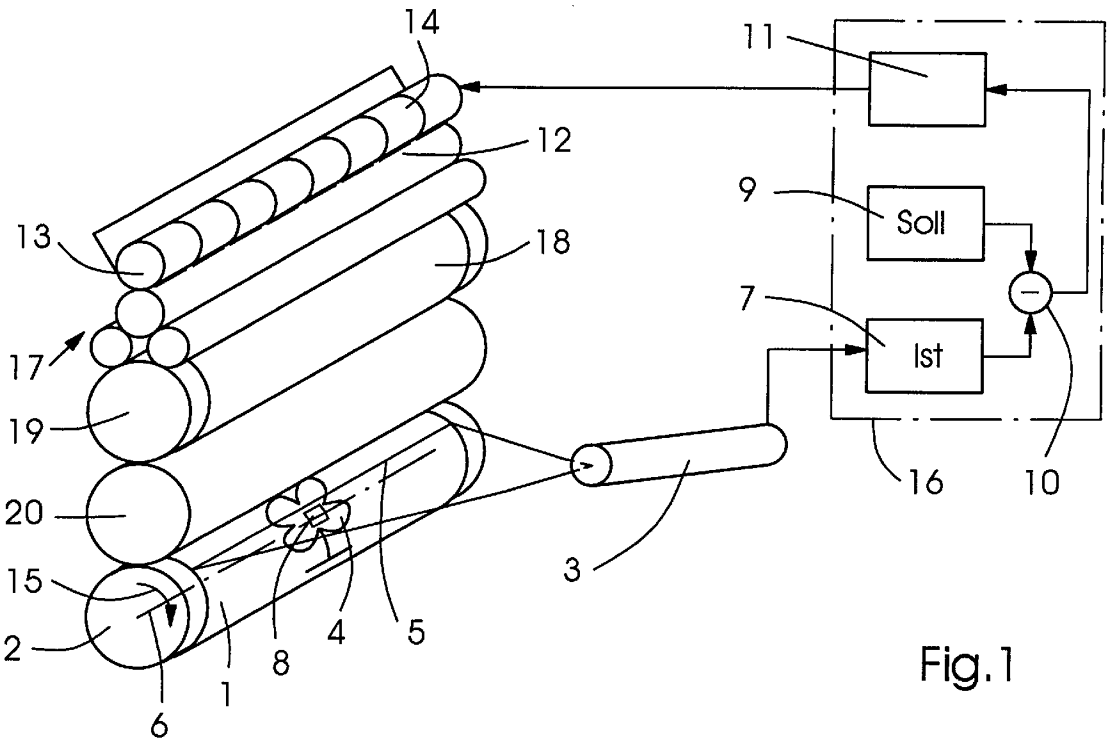
FIG. 1 is a diagram of a printing machine for implementing the process.

The process can be implemented with a conventional offset printing machine having the elements shown in FIG. 1. From a freshly printed sheet 1 fed by a printing cylinder 2, picture signals reflecting the printed image 4 produced on sheet 1 are obtained by means of an image recording arrangement 3. The printed image 4 is recorded along a line 5 which is parallel to the rotational axis 6 of printing cylinder 2. Such an image recording arrangement 3 is described, for example, in WO 95/00335 A1. The picture signal at the output of image recording arrangement 3 is supplied to a device 7 which converts the spectral reflectance value of a pixel 8 located in line 5 to an actual color location of a Lab color space. A suitable color space is the L*a*b* color space CIE 1976 (CIELAB) of the International Lighting Commission [Commission Internationale de l ÓEclairage] (CIE).

The signal of a sensor 9 for the setpoint color location of pixel 8 as well as the signal for the actual color location at the output of device 7 are supplied to comparison member 10. The comparison signal at the output of comparison member 10 is processed in a controlling member 11 into a manipulated variable which is supplied to the color controlling elements 12. Such a color controlling element 12 makes it possible to control the thickness of the ink layer on the surface of a ductor roller 13 in a zone 14. Zones 14 are arranged without gaps perpendicularly to feed direction 15 of sheet 1 and reach across its entire width. Such color controlling elements 12 are described in DE 30 25 980 A1. Device 7, sensor 9, comparison member 10, and controlling member 11 are components of a control device 16 which is known per see. A control device 16 which is suitable for implementing the process is the CPCÊ1 system by Heidelberger Druckmaschinen AG. An additional suitable control device is described in WO 95/00336 A2.

The offset printing machine furthermore comprises inking cylinders 17 for transferring the ink on ductor roller 13 having said zonal layer thicknesses to a printing plate 18. Printing plate 18 is fixed to a printing plate cylinder 19. Printing plate cylinder 19 is in rolling contact with a transfer cylinder 20. Corresponding to the inking on printing plate 18, the ink is transferred from printing plate 18 to sheet 1 by means of transfer cylinder 20, whereby sheet 1 is in rolling contact with transfer cylinder 20.

The offset printing machine schematically depicted in FIG. 1 comprises only one printing element. In multicolor printing, there are multiple elements 12, 13, 17, 18, 19, 20 and 2 corresponding to the number of colors which are to be printed on top of each other on sheet 1.

Figure 2:
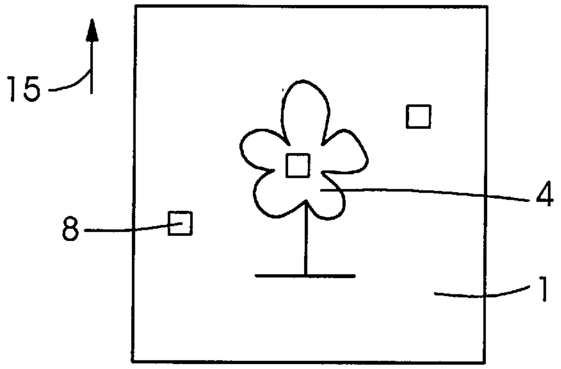
FIG. 2 is a diagram illustrating measured value acquisition.

According to the process, the actual color locations of a small number of pixels 8 are initially monitored. FIG. 2 schematically depicts three pixels 8 for which the respective actual color locations are determined. The total area of the three pixels 8 is less than 1% of the total area of printed image 4. For the first process step, measuring locations which are particularly suitable for color monitoring are selected on sheet 1. Particularly suitable are pixels 8 in which all the inks involved are printed on top of each other, respectively, by means of a grid. To the human eye, such pixels 8 contain gray tones which in the color space lie close to the achromatic axis.

Figure 3:
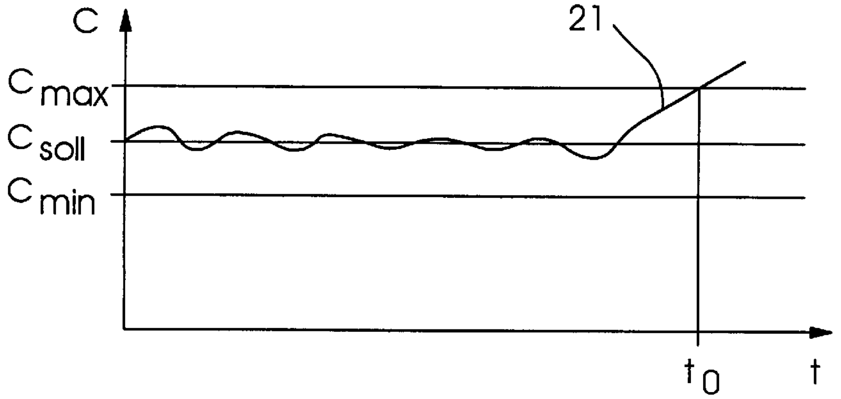
FIG. 3 is a graph illustrating measured value acquisition.

FIG. 3 shows how the measured value for the color location for such a selected pixel 8 is used for color monitoring. The graph shows the time characteristic 21 of the actual color location of pixel 8. For simplicityÕs sake, a one dimensional representation based on chroma $C_{ab}$* of the actual color location was selected. Chroma $C_{ab}$* of the Lab color space is calculated from $$C_{ab}^*=a^2+b^2$$

In addition to hue angle $h_{ab}$, where $h_{ab}$=arctan (b*/a*), it is one of the polar coordinates of the actual color location. In the graph, the set point of the chroma of pixel 8 is identified as $C_{soll}$ [$C_{setpoint}$]. If the actual value falls within a range between chroma $C_{min}$ and $C_{max}$, printing continues with the manipulated variables of color controlling elements 12 which were used to print the currently measured sheet 1. In the exemplary embodiment according to FIG. 3, the actual value exceeds the upper limiting value $C_{max}$ at instant $t_0$. Starting from that instant, the number of pixels 8 used for control is vastly increased. As shown in FIG. 4.1, actual color locations are determined from all pixels 8 which were printed on the surface of sheet 1. An additional option consists of using all pixels 8 of a range 22 on sheet 1, whereby the sum of the areas of all pixels 8 of all ranges 22 is more than 80% of the total printed area. The number of measured values is sufficient to derive manipulated variables for each zone 14 for the respective color controlling element 12. The manipulated variable changes the layer thickness of the ink applied to sheet 1 in zone 14. Changing the layer thickness causes a change in the actual color locations of pixels 8 of the respective zone 14. If the actual color locations are sufficiently long close enough to the setpoint color locations, it is then no longer necessary to process the measured values from the large number of pixels 8. Thus, it is possible to resume processing only the measured values from the 3 monitoring pixels as described above.

FIG. 5 illustrates a variant of the process showing how the manipulated variables of color controlling elements 12 can be determined after monitoring a small number $N_1$, of pixels 8 has revealed that $C_{min}$ or $C_{max}$ have been exceeded. In the graph shown, the number of pixels 8 is represented by $N_1$, and $N_2$ from which the actual measured values are obtained depending on the monitoring state. According to this variant, the measured values of a plurality $N_2$ of pixels 8 from several sheets 1 are used starting from instant $t_0$ when the value is exceeded up to an instant $t_1$. The measured values are averaged by pixels. The mean value of a pixel 8 from the measured values of several sheets 1 is used to derive the manipulated variables in conventional manner. Using the mean value over several sheets 1 increases the accuracy of the manipulated variable calculation.

List of Reference Numbers

1 material to be printed
2 printing cylinder
3 measuring arrangement
4 printed image
5 line
6 axis of rotation
7 device
8 measuring locations
9 sensor
10 comparison member
11 control member
12 color controlling element
13 ductor roller
14 zone
15 feed direction
16 control device
17 inking cylinders
18 printing plate
19 printing plate cylinder
20 transfer cylinder
21 time characteristic
22 ranges Having described the invention, the following is claimed:

1. Process for controlling coloration in multicolor printing wherein a photoelectric measuring arrangement is used to obtain actual color measurement values from the printed image, wherein the actual color measurement values are compared with predefined setpoint color measurement values, wherein the comparison signals are supplied to a color controlling device, whereby the layer thickness of the ink to be applied to a material to be printed can be controlled by means of color controlling elements, characterized in that continuous monitoring signals are derived at selected measuring locations (8), the number (N) of the measuring locations (8) is increased if the monitoring signals exceed a specified threshold value ($C_{min}$, $C_{max}$), and the actual color measurement values obtained from the increased number ($N_2$) of measuring locations (8) are processed into comparison signals.

2. Process in accordance with claim 1, characterized in that, at the instant when the threshold value ($C_{min}$, $C_{max}$) is exceeded, the actual color measurement values of the plurality ($N_2$) of the measurement locations (8) is averaged.

* * * * *